(12) United States Patent
Marupaduga

(10) Patent No.: US 11,265,752 B1
(45) Date of Patent: Mar. 1, 2022

(54) DYNAMIC ASSIGNMENT OF USERS IN A DUAL-CONNECTIVITY NETWORK USING SECTOR POWER RATIO

(71) Applicant: T-MOBILE INNOVATIONS LLC, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 52 days.

(21) Appl. No.: 16/925,676

(22) Filed: Jul. 10, 2020

(51) Int. Cl.
*H04W 36/06* (2009.01)
*H04W 28/02* (2009.01)
*H04W 24/08* (2009.01)

(52) U.S. Cl.
CPC ....... *H04W 28/0236* (2013.01); *H04W 24/08* (2013.01)

(58) Field of Classification Search
CPC .................................................... H04W 36/06
See application file for complete search history.

(56) References Cited

U.S. PATENT DOCUMENTS

2020/0083971 A1\* 3/2020 Zhong ................. H04B 7/0695
2021/0045007 A1\* 2/2021 Stawiarski ........ H04W 28/0289

\* cited by examiner

*Primary Examiner* — Ayanah S George

(57) ABSTRACT

Systems, methods, and computer-readable media herein dynamically assign user devices to communicate to cell sites and antenna arrays using either a first wireless communication protocol or a second wireless communication protocol. The sector power ratio (SPR) for a wireless communication protocol is monitored to determine if a key performance indicator (KPI) should be monitored. Once the SPR exceeds a pre-determined threshold, the KPI is monitored to determine to what degree, if any, the KPI has exceeded a threshold value. An upper limit to the number of user devices allowed to communicate to the cell cite using the first wireless communication protocol is then modified at least in part based on the SPR and the KPI values. User devices are then re-assigned from the first to the second wireless communication protocol based on the modified upper limit of user devices allowed to use the first wireless communication protocol.

20 Claims, 6 Drawing Sheets

DYNAMIC ASSIGNMENT OF USERS IN A DUAL-CONNECTIVITY NETWORK USING SECTOR POWER RATIO

SUMMARY

A high-level overview of various aspects of the invention is provided here as an overview of the disclosure and to introduce a selection of concepts further described below in the detailed description. This summary is not intended to identify key features or essential features of the claimed subject matter, nor is it intended to be used as an aid in isolation to determine the scope of the claimed subject matter.

In brief and at a high level, this disclosure describes, among other things, systems, methods, and computer-readable media that employ sector power ratio (SPR) information to dynamically combat the negative impacts of noise and interference at a cell site.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
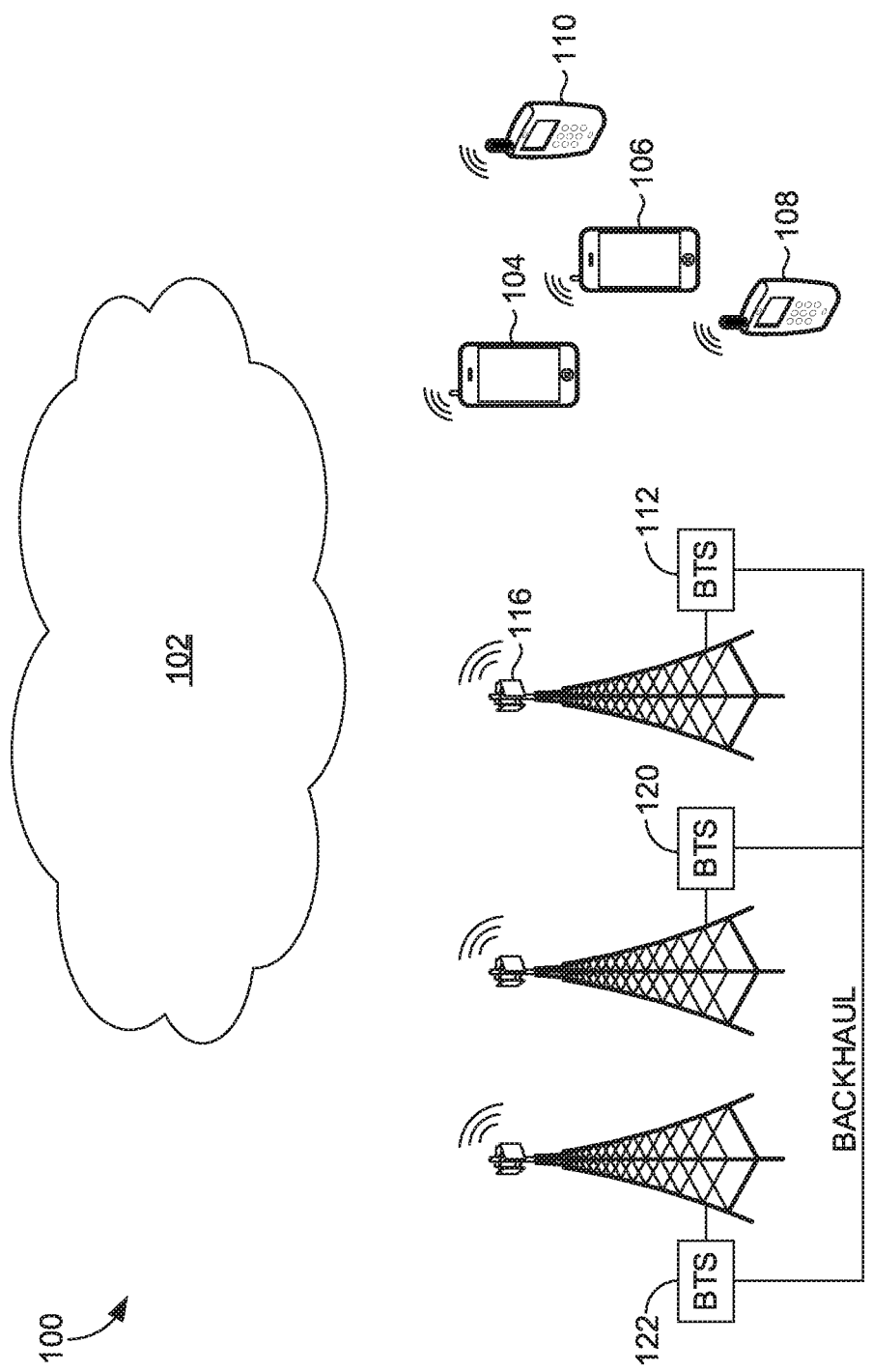
FIG. 1 depicts a schematic for an exemplary device, in accordance with an embodiment of the present invention.

The subject matter of select embodiments of the present invention is described with specificity herein to meet statutory requirements. The Detailed Description is not intended to define what is regarded as the invention, which is the purpose of the claims. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AWS Advanced Wireless Services
BRS Broadband Radio Service
BTS Base Transceiver Station
CDMA Code Division Multiple Access
EBS Educational Broadband Services
eNodeB Evolved Node B
EVDO Evolution-Data Optimized
GPS Global Positioning System
GSM Global System for Mobile Communications
HRPD High Rate Packet Data
eHRPD Enhanced High Rate Packet Data
LTE Long Term Evolution
LTE-A Long Term Evolution Advanced
PCS Broadband Personal Communications Service
RNC Radio Network Controller
SyncE Synchronous Ethernet
TDM Time-Division Multiplexing
VOIP Voice Over Internet Protocol
WAN Wide Area Network
WCS Wireless Communications Service
WiMAX Worldwide Interoperability for Microwave Access Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media includes volatile and/or non-volatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and/or communications media. Computer storage media, or machine-readable media, include media implemented in any method or technology for storing information. Examples of stored information include computer-useable instructions, data structures, program modules, and other data representations. Computer storage media include RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present invention.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

At a high level, systems, methods, and computer-readable media of the present invention employ sector power ratio (SPR) information, which describes the radio frequency power that is radiated outside of an antenna array's sector relative to the radio frequency power that is radiated and retained within the antenna array's sector, to dynamically combat noise and interference at a cell site. The negative impacts caused by high-powered undesired RF radiation at a cell site may be reduced or mitigated by reducing the number of users assigned to communicate with the wireless antenna array using a particular wireless communication protocol. In particular, a wireless communication protocol with a high SPR and key performance indicators that exceed threshold values may have limits placed such that the number of users is limited to improve performance for those using that particular wireless communication protocol.

In a first aspect of the present invention, a method is provided. The method comprises monitoring a sector power ratio of a first wireless communication protocol within which a wireless communication protocol is utilized to communicate with an antenna array at a particular cell cite. The method further comprises determining that the sector power ratio exceeds a pre-determined threshold that may be selected by an administrator. In embodiments, the method modifies an upper limit of a number of user devices that may be assigned to communicate with the antenna array using the first wireless communication protocol. The method continues by, subsequent to modifying the upper limit of user devices, re-assigning a set of user devices previously assigned to communicate using the first wireless communication protocol to be assigned to communicate using a second wireless communication protocol.

In a second aspect of the present invention, computer-readable media is provided, the computer-readable media having computer-executable instructions embodied thereon that, when executed, perform a method. In accordance with the media, it is determined that the sector power ratio at a particular cell cite exceeds a pre-determined threshold. Once it is determined that the sector power ratio threshold has been exceeded, a key performance indicator is monitored to determine the magnitude of disparity between a first threshold and a second threshold. An upper limit of the number of user devices which are to utilize the first wireless communication protocol is established based on both the key performance indicator exceeding the threshold and the magnitude that it exceeds the threshold. A set of user devices assigned to use the first wireless communication protocol at the cell cite is then re-assigned to use the second wireless communication protocol based on the determined upper limit.

In a third aspect of the present invention, a system is provided. The system comprises monitoring a sector power ratio of a first wireless communication protocol within which a wireless communication protocol is utilized to communicate with an antenna array at a particular cell cite. The system further comprises determining that the sector power ratio exceeds a pre-determined threshold that may be selected by an administrator. In embodiments, the system modifies an upper limit of a number of user devices that may be assigned to communicate with the antenna array using the first wireless communication protocol. The system continues by, subsequent to modifying the upper limit of user devices, re-assigning a set of user devices previously assigned to communicate using the first wireless communication protocol to be assigned to communicate using a second wireless communication protocol.

Turning now to FIG. 1, an example of a network environment 100 suitable for use in implementing embodiments of the present disclosure is provided. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 includes a network 102 that provides service to current UE 104 and 106 and one or more legacy UE 108 and 110. The network 102 may be accessible through a base station 112 that is connected to a backhaul server (not shown). The base station 112 and/or a computing device (e.g., whether local or remote) associated with the base station 112 may manage or otherwise control the operations of components of a cell site, including an antenna array 116. The base station 112 and/or the computing device associated with the base station 112 may include one or more processors and computer-readable storage media having computer-executable instructions or computer instruction modules embodied thereon for execution by one or more processors.

The antenna array 116 may radiate in a particular direction and thus may correspond to a particular sector of a cell site. The antenna array 116 may have a plurality of antenna elements, in embodiments. In one embodiment, the antenna array 116 is configured to have a plurality of elements that in number, arrangement, and/or density, are configured for mMIMO. In one such embodiment, the base station 112 may include a radio and/or a controller, such as a Massive Multiple-Input Multiple-Output Unit for controlling a mMIMO configured antenna array, such as the antenna array 116 having a plurality of antenna elements. The base station 112 may use the controller to monitor one or more of throughput, signal quality metrics (e.g., SINR), a quantity of unique users/subscribers, a quantity of unique UE(s), and/or remote location filings that occur at the base station, all of which may be monitored dynamically and/or as stored in a data store.

The base station 112 may use a radio that is connected to the antenna array 116 by a physical RF path, where the radio is used to cause the antenna array 116 to transmit radio-frequency signals using the plurality of antenna elements. The plurality of antenna elements in the antenna array 116 may include portions of antenna elements (not shown). In embodiments, the plurality of antenna elements of the antenna array 116 may be partitioned such that a first portion of antenna elements may be associated with, dedicated to, correspond to, and/or be configured to operate using a first access technology, and a second portion of antenna elements may be associated with, dedicated to, correspond to, and/or be configured to operate using a second access technology. In one embodiment, the plurality of antenna elements may be partitioned into unequal groups or alternatively "split" into equal halves, wherein each group or half operates to provide a coverage area for a distinct access technology when the antenna array 116 operates in a dual technology mode.

In some embodiments, the antenna array 116 is partitioned such that the first portion of antenna elements is associated with the first access technology and the second portion of antenna elements is associated with the second access technology. When the antenna array 116 is operating in a dual technology mode, each portion of the plurality of antenna elements may operate using only one distinct protocol and/or access technology relative to the other portions in the antenna array, in some embodiments. In one example, a first portion of antenna elements may operate using 5G wireless access technology and the second portion of antenna elements may operate using 4G wireless access technology. Additionally, it will be understood that the terms "first" and "second" are used herein for the purposes of clarity in distinguishing portions of antenna elements from one another, but the terms are not used herein to limit the sequence, relevance, number of portions, technological functions, and/or operations of each portion unless specifically and explicitly stated as such.

As such, the base station 112 may provide current UE 104 and 106 and legacy UE 108 and 110 with access to the network 102, in embodiments. In some embodiments, the first portion of antenna elements may communicate with current UE 104 and 106 using 5G technology, and the second portion of the antenna elements may communicate with legacy UE 108 and 110 using 4G technology. When operating in the dual technology mode, the antenna array 116 may concurrently connect to and communicate with the current UE 104 and 106 and legacy UE 108 and 110 using, respectively, at least two distinct access technologies.

Accordingly, in one example, when the antenna array 116 is operating in the dual technology mode, the base station 112 concurrently acts an eNodeB (or "eNB") and gNodeB (or "gNB"). As such, the base station 112 may provide service to one or more access technologies to both current and legacy UE. In addition to communicating with the current UE 104 and 106 and the legacy UE 108 and 110, the base station 112 may also communicate with one or more neighboring base stations. In some embodiments, the base station 112 may communicate with neighboring base station 120 using the first access technology and may communicate with another neighboring base station 122 using the second access technology. For example, because the base station 112 may operate concurrently as an eNodeB and a gNodeB using the antenna array 116 that is partitioned and operating in a dual technology mode, the base station 112 may communicate with other base stations, for example, including legacy base stations that cannot use current access technologies (e.g., 5G) or current base stations that lack backward compatibility with prior access technologies (e.g., 4G). In embodiments, the base station 112 may bi-directionally exchange information with neighboring base stations 120 and 122 through an X2 interface or X2 link. Information regarding signal quality, RF conditions, one or more RLFs, and SINR levels at each of the neighboring base stations 120 and 122, and/or as reported from UE to the neighboring base stations 120 and 122 may be communicated to the base station 112 via the X2 link. Additionally or alternatively, information regarding signal quality, RLFs, and SINR levels at each of the neighboring base stations 120 and 122 may be communicated to the base station 112 over the backhaul.

As mentioned, the base station 112 may include a radio and/or a controller, such as an MMU, that enables the base station 112 to adjust or modify the operations and transmissions of the plurality of antenna elements in the antenna array 116. In embodiments, the operations, configurations, and/or settings of each antenna element may be individually controlled and adjusted by the base station 112 using the controller. In some embodiments, the operations, configurations, and/or settings of the first portion of antenna elements may be controlled and adjusted as a group by the base station 112 using a controller, such as an MMU, independent of the second portion of antenna elements. In a similar fashion, the operations, configurations, and/or settings of the second portion of antenna elements may be controlled and adjusted as a group by the base station 112 using the controller, independent of the first portion of antenna elements. Accordingly, the base station 112 may use a controller to independently adjust different groups or portions of antenna elements within one antenna array.

In embodiments, the operations, configurations, and/or settings of each individual antenna element may be adjusted and customized. For example, the base station 112 instructs a portion of antenna elements to transmit one or more synchronization signals using a periodicity. In another example, the portion of antenna elements may transmit a plurality of synchronization signals using the periodicity, as instructed by the base station 112. The synchronization signals may be specific to and/or configured for the first access technology, in embodiments.

Accordingly, the base station 112 may use a controller to independently adjust different individual antenna elements, any number of groupings and/or subset(s) of each portion of antenna elements, and/or portions of antenna elements within one antenna array. In embodiments, the base station 112 may use a controller to measure and monitor one or more of throughput, signal quality metrics (e.g., SINR), a quantity of unique users/subscribers, a quantity of unique UE, and/or RLFs.

Figure 2:
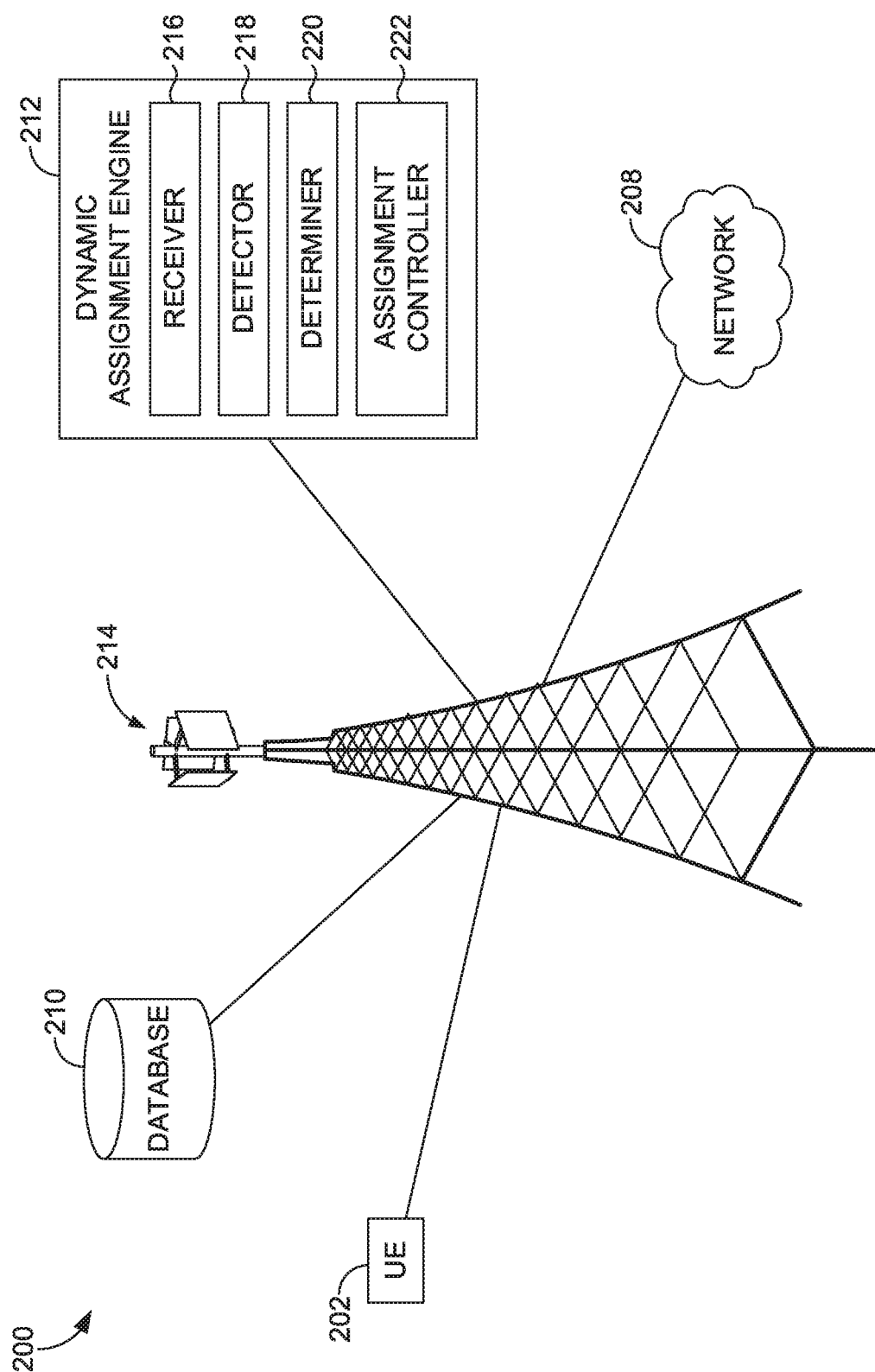
FIG. 2 depicts an exemplary telecommunications environment, in accordance with an embodiment of the present invention.

Turning now to FIG. 2, network environment 200 is an exemplary network environment in which implementations of the present disclosure may be employed. Network environment 200 is one example of a suitable network environment and is not intended to suggest any limitation as to the scope of use or functionality of the present disclosure. Neither should the network environment be interpreted as having any dependency or requirement relating to any one or combination of components illustrated.

Network environment 200 includes UE 202 (network environment 200 may contain more UEs), network 208, database 210, dynamic assignment engine 212, and cell site 214. In the network environment 200, UE 202 may take on a variety of forms, such as a PC, a user device, a smart phone, a smart watch, a laptop computer, a mobile phone, a mobile device, a tablet computer, a wearable computer, a PDA, a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with network 208, which may be a public or a private network.

In some aspects, the UE 202 corresponds to a user device or a computing device. For example, the user device may include a display(s), a power source(s) (e.g., a battery), a data store(s), a speaker(s), memory, a buffer(s), a radio(s), and the like. In some implementations, the UE 202 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the UE 202 in network environment 200 may optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2 and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and data services to UE 202 and any other UEs. For example, network 208 may be associated with a telecommunications provider that provides services (e.g., LTE) to the UE 202. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), or a 5G network. The network 208 may also be, in whole or in part, or have characteristics of, a self-optimizing network.

In some implementations, cell site 214 is configured to communicate with the UE 202 that is located within the geographical area defined by a transmission range and/or receiving range of the radio antennas of cell site 214. The geographical area may be referred to as the "coverage area" of the cell site or simply the "cell," as used interchangeably hereinafter. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited geographical area. For the purposes of the present disclosure, it may be assumed that it is undesirable and unintended by the network 208 that the cell site 214 provide wireless connectivity to the UE 202 when the UE 202 is geographically situated outside of the cell associated with the cell site 214.

In an exemplary aspect, the cell site 214 comprises a base station that serves at least one sector of the cell associated with the cell site 214 and at least one transmit antenna for propagating a signal from the base station to one or more of the UE 202. In other aspects, the cell site 214 may comprise multiple base stations and/or multiple transmit antennas for each of the one or more base stations, any one or more of which may serve at least a portion of the cell. In some aspects, the cell site 214 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more, the radius measured at ground level and extending outward from an antenna at the cell site. In another example, a small cell may correspond to a coverage area having a radius of approximately less than three miles, the radius measured at ground level and extending outward from an antenna at the cell site.

As shown, cell site 214 is in communication with the dynamic assignment engine 212, which comprises a receiver 216, a detector 218, a determiner 220, an analyzer 222, and an assignment controller 224. The dynamic assignment engine 212 may connect UE 202 and other UEs to frequency bands within range of the UE 202 or other UEs for access to network 208. The dynamic assignment engine 212 may also delay or prevent UE 202 connection to a frequency band for access to network 208. The dynamic assignment engine 212 may communicate with the database 210 for storing and retrieving data.

For example, the receiver 216 may retrieve data from the UE 202, the network 208, the database 210, and the cell site 214. In some embodiments, the receiver 216 may receive requests from UEs for access to a particular frequency band. Further, data the receiver 216 may access includes, but is not limited to, location information of the UE 202 and channel quality information. Location information may comprise GPS or other satellite location services, terrestrial triangulation, an access point location, or any other means of obtaining coarse or fine location information. The location information may indicate geographic location(s) of one or more of a user device, an antenna, a cell tower, a cell site, and/or a coverage area of a cell site, for example. Channel quality information may indicate the quality of communications between one or more user devices and a particular cell site. For example, channel quality information may quantify how communications are traveling over a particular communication channel quality, thus indicating when communications performance is negatively impacted or impaired. As such, channel quality information may indicate a realized uplink and/or downlink transmission data rate of a cell site and/or each of one or more user devices communicating with the cell site, observed SINR and/or signal strength at the user device(s), or throughput of the connection between the cell site and the user device(s). Location and channel quality information may take into account the UEs' capability, such as the number of antennas of the user device and the type of receiver used by the user device for detection. The receiver 216 may also be configured to receive information from cell sites other than cell site 214 or other processors and/or servers.

The receiver 216 may also access SPR. SPR is a measure of an antenna's ability to minimize interference. SPR describes an RF power that is radiated outside of an antenna array's sector relative to an RF power that is radiated and retained within the antenna array's sector. Because SPR is a ratio, SPR may be represented using a percentage value or numerical value. An example of a low SPR value is 3-4%, and an example of a high SPR value is 8-10%. Antennas with greater spillover areas have greater SPR values. SPR information may be used for dynamically combatting interference and noise at cell site 214. Additionally, the SPR values of cell site antennas may be used for selection and assignment of specific frequency bands to component carriers of UEs in a telecommunications environment.

Each sector corresponds to a radiation pattern of a corresponding antenna at the cell site 206. The shape, size, and dimension(s) of the service coverage area 218 of the cell site 206 are, generally, determined by an antenna's specific radiation pattern, as well as a direction, electrical tilt, mechanical tilt, installation height above the ground or surrounding geographic area, technical operating specifications, materials, obstructions (i.e., buildings, mountains, or other elevations), and power supplied to each of the first, second, and third antennas 208, 210, and 212 of the cell site 206, for example. The first, second, and third antennas 208, 210, and 212 wirelessly receive and transmit RF transmissions to and from, for example, user equipment, other antennas, other cell sites, base stations, and/or satellites, in order to facilitate communications between such devices, though not shown in FIG. 3 for clarity. In an embodiment, the first, second, and third antennas 208, 210, and 212 of the cell site 206 capture two-way communications between the network 202 and user equipment devices that are within a geographic area corresponding to the service coverage area 218 of the cell site 206.

Increased or high SPR values have negative impacts, which may be manifested low performance indicators. The key performance indicators (KPI) that may be monitored to indicate the negative impacts of a high SPR value may be low sector average throughput or low individual UE throughput within a particular band or wireless communication protocol associated with an antenna array. Negative impacts that high-powered, undesired RF radiation at a cell site causes may be reduced or mitigated by re-assigning a particular number of users from the negatively affected wireless carrier protocol band to another wireless carrier protocol band. For example, a frequency band that is associated with a 5G network may experience a high SPR value due to a large degree of interference which may impact the overall sector throughput of 5G users. Once the SPR value associated with the 5G network or wireless communication protocol is above a particular threshold and the key performance indicators are sufficiently poor, the number of UEs able to communicate with the antenna array via the 5G wireless communication protocol is capped such that a number of users are reassigned to another wireless communication protocol such as 4G or LTE. In an exemplary situation, by means of capping the number of users or UE able to communicate with a wireless antenna array via the negatively affected wireless protocol, the KPI of the sector will be improved.

Additionally, SPR quantifies the power of RF radiation that is outside of the sector of an antenna relative to the power of the RF radiation radiated within the same sector of the same antenna. As such, the SPR represents the power of the undesired RF signal relative to the power of the desired RF signal, for a particular antenna. Accordingly, SPR is a measure of power and undesired RF radiation refers to an amount of power of the undesired RF radiation. Thus, as undesired RF spillover of an antenna increases, the SPR of the same antenna increases and vice versa, when all other factors are controlled. As undesired RF spillover and SPR increase, interference and noise increase at the cell site 214. Due to these measures, SPR may be used as a predictor, indictor, and/or measure of an antenna's likelihood of causing interference and noise, or actual causation of interference and noise. SPR may be affected by orientation (i.e., how the service coverage area has been partitioned into sectors), electrical tilt, mechanical tilt, carrier band associated with an antenna, technical operating specifications of an antenna, manufacturing and materials of an antenna, environmental conditions (i.e., weather, heat, wear and tear), and power supplied to an antenna, for example.

Further, SPR for an antenna may be calculated using RF radiation patterns. For example, the SPR of the antenna accounts for the power of its undesired RF signal relative to the power of the desired RF signal. The SPR of the antenna quantifies the amount of power of the undesired RF radiation contributed by the antenna to areas relative to the amount of power of the desired RF radiation in a sector of the antenna. Due to spillover among various antennas, certain areas experience the presence of interference and noise.

Turning to detector 218, the detector 218 may detect UEs within a range, frequency bands, SPRs of frequency bands, and loading factors (e.g., loading volume) corresponding to frequency bands, etc. Loading factors may change depending upon the day and time of day (e.g., world events such as natural disasters, terror attacks, pandemics, or religious holiday may prompt surges of UE traffic to or from specific locations), and may be stored in the database 210. Loading factors may include cell site 214 heat signature information, cell site 214 component performance information, channel quality information, or processor load measurements. Factors affecting the heat signature information of the cell site 214 include component model, component type, manufacturer, age of a component, wear and tear due to environmental factors, etc. Further, loading factors may also include an amount of current, backhaul traffic, or an anticipated current or backhaul traffic. Additionally, factors affecting loading volume may include a quantity of users connected to a frequency band or antenna properties at a time of receiving communication parameters from UEs connected to the frequency band. Other factors affecting loading volume may also include a capacity of the frequency band and data received from the quantity of users connected to the frequency band. The data received from the quantity of users may comprise a rate at which UEs are connected to and disconnected from the frequency band.

Detector 218 may also detect wireless communication protocols and wireless telecommunications networks associated with particular frequency bands. For example, the detector 218 may detect that a first wireless communication protocol of a first frequency band is a 5G wireless communication protocol and a second wireless communication protocol of a second frequency band is a 4G wireless communication protocol. Additionally, the detector 218 may detect a third wireless communication protocol of a third frequency band that comprises both a 5G and a 4G wireless communication protocol such that the network has an ability to maintain dual connectivity or a particular UE is able to connect to either 5G and 4G wireless communication protocols simultaneously.

Turning to determiner 220, the determiner 220 may determine that a first wireless communication protocol has a high SPR. In some embodiments, a wireless communication protocol corresponding to one antenna may have an SPR value that is less than an SPR value of another adjacent antenna at the cell site. Determiner 220 may also determine, in response to a determination that the wireless communication protocol has a high SPR, that a monitored KPI value has exceeded a threshold value. This determination may be based on an evaluation of the average throughput of the entire sector. The average sector throughput may exceed a pre-determined threshold by a particular magnitude determined by determiner 220. Other KPI values monitored may be an individual UE throughput or the data usage for the sector. Determiner 220 may determine, in response to a high SPR value, the magnitude that the KPI values exceed a threshold value.

Because SPR values may be affected by orientation (i.e., how the service coverage area has been partitioned into sectors), electric tilt, mechanical tilt, specific frequencies of a carrier band associated with an antenna, technical operating specifications of an antenna, manufacturing and materials of an antenna, environmental conditions, and power supplied to an antenna, the determiner 220 may dynamically determine SPR values of antennas at the cell site 214 when a UE enters the service coverage area of the cell site. Alternatively, determiner 220 may determine SPR values of the antennas at the cell site 214 periodically, the dynamic assignment engine 212 storing the SPR values in the database 210 at the base station controlling the cell site 214. Stored SPR values may be referenced when a UE enters a service coverage area of the cell site 214. Additionally or alternatively, SPR values of the antennas at the cell site 214 may be determined for individual antennas when each antenna is installed at the cell site and stored in database 210 at the base station controlling the cell site 214. In this way, dynamically determined or periodically updated SPR values may be compared, for example, by the base station to an initial or installation SPR value so that the performance of each antenna can be monitored, for example.

Further, determiner 220 may determine an upper limit of the number of users able to communicate to the wireless antenna array via a first wireless communication protocol. The determination of the upper limit may be based at least in part on the magnitude that the monitored KPI values exceed their respective pre-determined threshold values. For example, the SPR value for the first wireless communication protocol exceeds the pre-determined threshold and the monitored KPI of average sector throughput exceeds the threshold by 10 percent. Once it is determined the magnitude the KPI has exceeded the threshold value, determiner 220 may determine that the upper limit of users is reduced by 10 percent.

Lastly, assignment controller 224, in response to the modification of the upper limit of users available to communicate via the first wireless communication protocol, may dynamically modify the assignment of a number of UEs from one communication protocol to another within a wireless communication network. The assignment controller 224 may re-assign a number of UEs connected to a first wireless communication protocol to a second wireless communication protocol based on an SPR value exceeding a pre-determined threshold and subsequent determination that a key performance indicator associated with the first wireless communication protocol also exceeds a threshold value. Furthermore, the assignment controller 224 may assign a number of UEs from the second communication protocol to the first wireless communication protocol upon determining that the SPR value and the associated key performance indicators are within acceptable values as determined by the network administrator.

Figure 3:
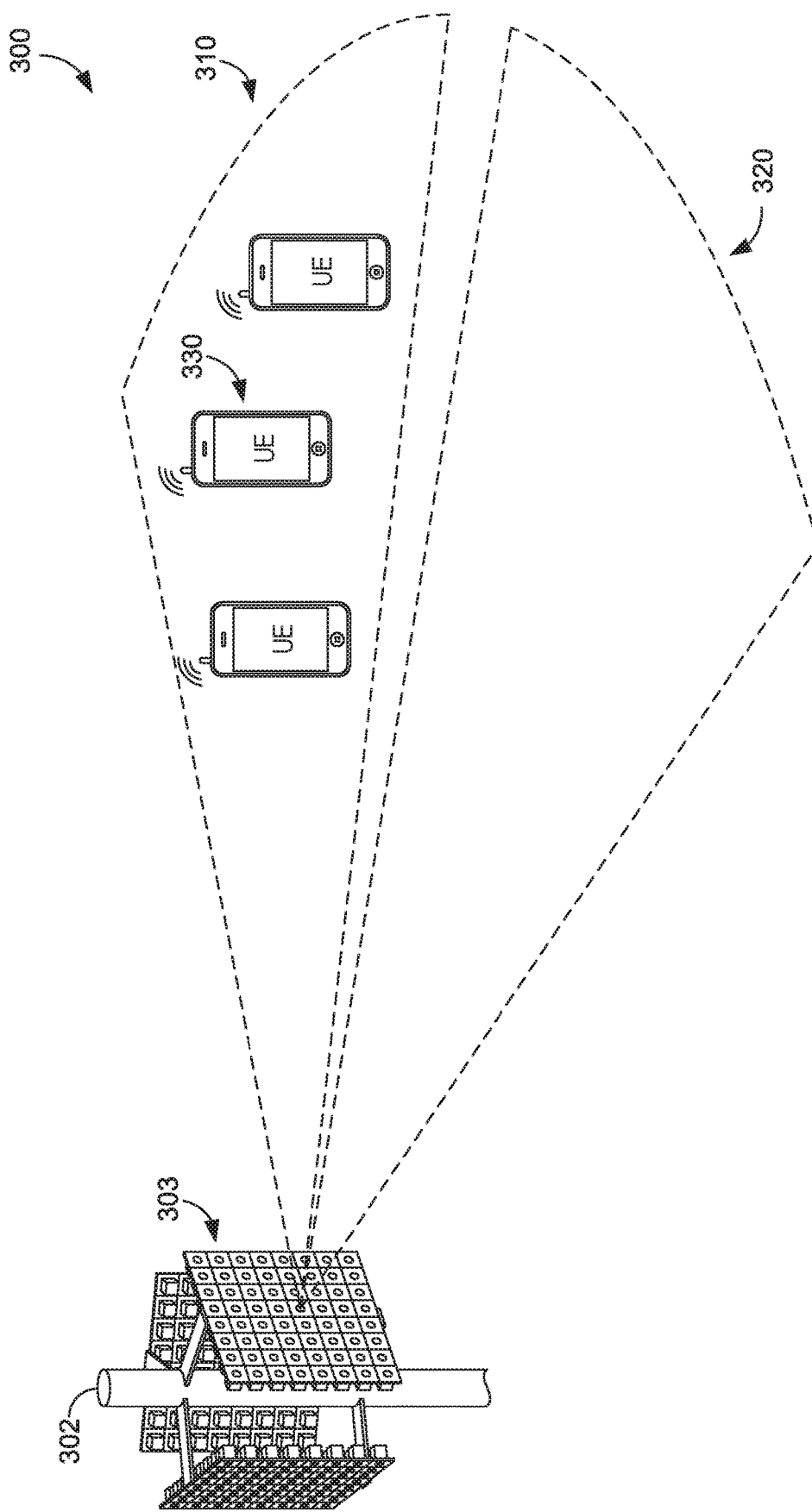
FIG. 3 depicts an exemplary schematic of the cell site, in accordance with an embodiment of the present invention.

Turning now to FIG. 3, exemplary multiple communication protocol environment 300 comprises cell site 302, a first antenna array 303, one or more antennas, a first communication protocol 310, and a second communication protocol 320. As can be seen in the aspect depicted in FIG. 3, the first communication protocol 303 includes the one or more antennas. In aspects, the one or more antennas may be dipole antennas, having a length, for example, of ¼, ½, 1, or 1½ wavelength. In aspects, the first antenna array 303 may be an active antenna array, FD-MIMO, massive MIMO, 3G, 4G, 5G, and/or 802.11. While we refer to dipole antennas herein, in other aspects, the one or more antennas 304 may be monopole, loop, parabolic, traveling-wave, aperture, yagi-uda, conical spiral, helical, conical, radomes, horn, and/or apertures, or any combination thereof. It is noted that adjusting one or more individual power supplies to the one or more antennas of the first antenna array 303 may be applicable to an antenna array comprising any type of antenna targeting any portion of the RF spectrum (though any lower than VHF may be size prohibitive). In one aspect, the one or more antennas may be configured to communicate in the UHF and/or SHF spectrum, for example, in the range of 1.3 GHz-30 GHz.

By way of a non-limiting example, the first antenna array 303 may comprise 64 antenna elements arranged in an 8×8 structure. In other aspects, the first antenna array 303 may comprise antenna elements arranged in an 8×4, 4×8, or 4×4 configuration. Each antenna element of the first antenna array 303 comprises a dedicated power supply having a certain phase and amplitude to a respective antenna element. In an aspect, the power supply comprises a power amplifier. In an aspect not depicted in the figures, the base station may further comprise a processor. The processor may be one or more of processors, servers, computer processing components, or the like. In some aspects, the processor may be communicatively coupled to each node and/or to each antenna of each node.

In certain aspects, the first antenna array 303 may communicate or is capable of communicating with devices, using a 5G wireless communication protocol. While in this example 5G is mentioned as a wireless communication protocol, it should be understood that any wireless communication protocol standard may be utilized for example, 3G, 4G, LTE, 5G, 802.11, or any other operator-elected wireless communication protocol standard. In the aspect depicted in FIG. 3, the first antenna array 303 can include 64 antenna elements each with a distinct direction which may be known, and where each antenna element is capable of communicating with one or more devices, e.g., using one or more specific beams, each identifiable as a beam index, as referred to herein, in aspects. In the same or alternative aspects, a device may communicate with more than one antenna element of the first antenna array 303. In aspects, using the methods and systems disclosed herein with a high-density antenna array, such as the first antenna array 303, and using a 5G wireless communication protocol as an example, can facilitate the strategic assignment of beam indices and/or allotment of beam indices tailored for a specific purpose or environment.

In some embodiments, the receiver 216, in communication with the cell site 302, may detect when a UE enters an area covered by one or more antenna elements of an antenna array, e.g., the first antenna array 303 of the cell site 302 of FIG. 3. In some embodiments, UEs may detect and/or measure one or more signals, e.g., synchronizations signals, from the antenna array when entering an area covered by the one or more antenna elements of the antenna array. As one example, UE 330 may have connection with the antenna array 303 utilizing the first wireless communication protocol 310. As another example, UE 330 may have connection with the antenna array 303 utilizing the second wireless communication protocol 320. As such, UE 330 and any other array is able to communicate with antenna array 303 via either the first wireless communication protocol 310 or the second wireless communication protocol 320 at any given time and as the network has capacity to allow for the particular wireless communication protocol. In other words, as the SPR and KPI of the first wireless communication protocol exceed threshold values, the assignment controller 224 may re-assign a number of users from the first wireless communication protocol 310 to the second wireless communication protocol 320.

By way of example, as depicted by FIG. 3, detector 218 may detect that the sector or the cell site 310 has a low SPR value due to a low degree of interference. Consequently, KPI values would not be monitored and the upper limit on the number of UEs able to communicate with the antenna array 303 via the first wireless communication protocol 310 would not be lowered. In another example, detector 218 may detect that the sector or the cell 310 has a high SPR value due to a high degree of interference. Key performance indicators are thus monitored such that determiner 220 may determine if action is required. Determiner 220 may determine that the sector average throughput is higher than a selected threshold value. Furthermore, determiner 220 may determine that the throughput for individual UEs utilizing the first wireless communication protocol, such as UE 330, is higher than a threshold value. Further, determiner 220 may determine that the average data usage within the sector utilizing the first wireless communication protocol is lower than a threshold value. The threshold values for the sector throughput, the UE throughput, or the data usage may be determined by a network administrator or automatically selected based on desired performance of the sector.

Accordingly, the UE 330 would not be re-assigned from the first wireless communication protocol 310 to the second wireless communication protocol 320. Since the determination that none of the KPI values violate the respective pre-determined threshold values, the upper limit of the number of UEs assigned to communicate via the first wireless communication protocol remains unchanged.

Figure 4:
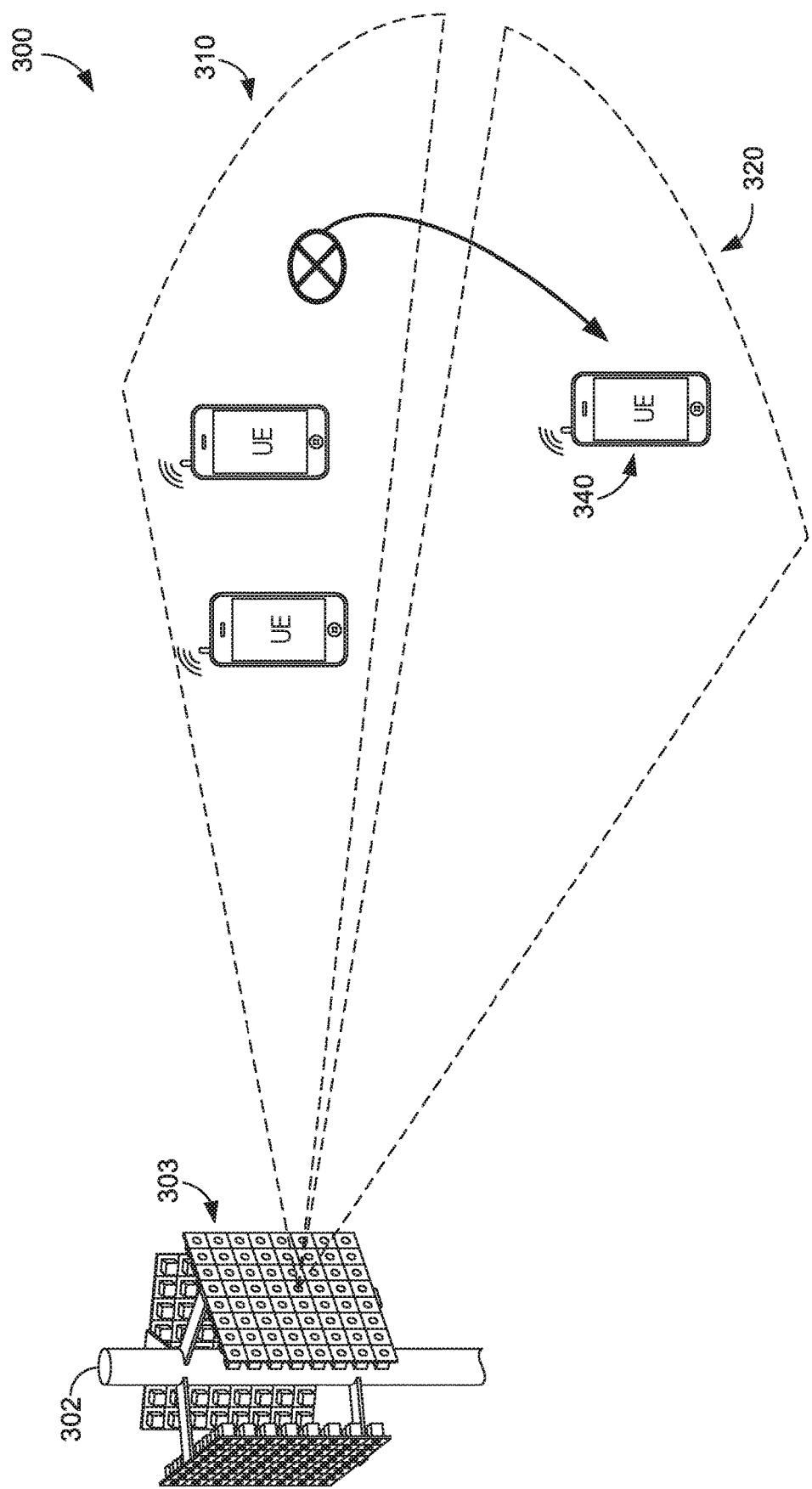
FIG. 4 depicts an exemplary schematic of the cell site, in accordance with an embodiment of the present invention.

By way of example, as depicted by FIG. 4, detector 218 may detect that the first wireless communication protocol 310 has a high SPR value due to a high degree of interference. Further, determiner 220 may determine that the sector average throughput is lower than a selected threshold value. Furthermore, determiner 220 may determine that the throughput for individual UEs utilizing the first wireless communication protocol such as UE 330, is lower than a threshold value, Further, determiner 220 may determine that the average data usage within the sector utilizing the first wireless communication protocol is higher than a threshold value. The threshold values for the sector throughput, the UE throughput, or the data usage may be determined by a network administrator or automatically selected based on desired performance of the sector.

Accordingly, the UE 340 would be re-assigned from the first wireless communication protocol 310 to the second wireless communication protocol 320 via assignment controller 224. A dynamic change in assignment of the UE 340 from the first wireless communication protocol 310 to the second wireless communication protocol 320 is in response to the determination that the SPR and KPI values exceed threshold values such that the assignment controller places a limit on the number of UE able to be assigned to the first wireless communication protocol 310. This limit is based on the magnitude that the KPI value exceeds a pre-determined threshold value and a magnitude that the SPR exceeds a threshold value. As an example, if the KPI exceeds the threshold value by 5 percent, the upper limit of the number of UEs able to communicate with the wireless antenna array 303 via the first wireless communication protocol may be reduced 5 percent from its previous value.

Figure 5:
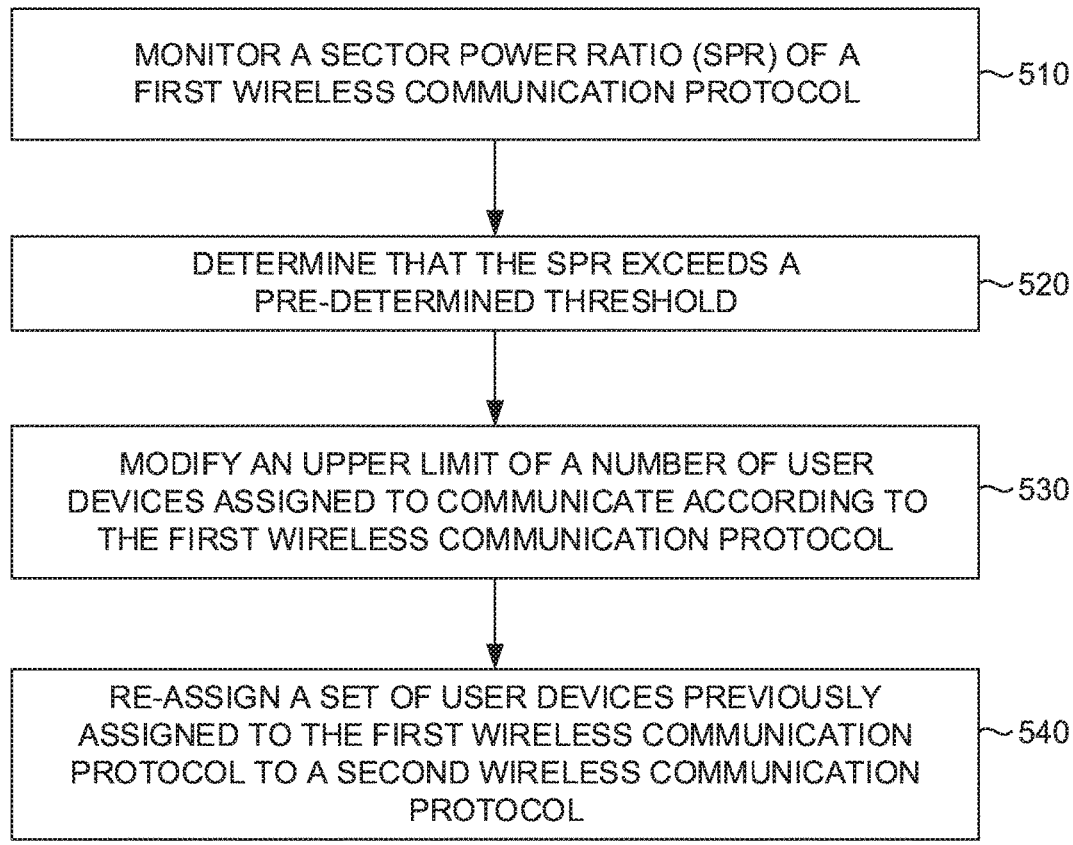
FIG. 5 depicts an exemplary method, in accordance with an embodiment of the present invention.

Turning now to FIG. 5, flow diagram 500 comprises an exemplary method dynamically assigning a user device connection from communication with an antenna array via a first wireless communication protocol to a second wireless communication protocol. Initially at block 510, a sector power ratio of a first wireless communication protocol 310 is monitored. At block 520, the SPR value is determined to have exceeded a pre-determined threshold value. At block 530, based on the determination that the SPR value exceeds the pre-determined threshold, the upper limit of the number of user devices assigned to communicate according to the first wireless communication protocol is modified to reduce the number of users assigned to the first wireless communication protocol. Further, the modification of the upper limit may also be in response to a determination that a monitored KPI value exceeds a pre-determined threshold value. At block 540, a dynamic re-assignment of a set of user devices previously assigned to the first wireless communication protocol to the second wireless communication protocol occurs.

Figure 6:
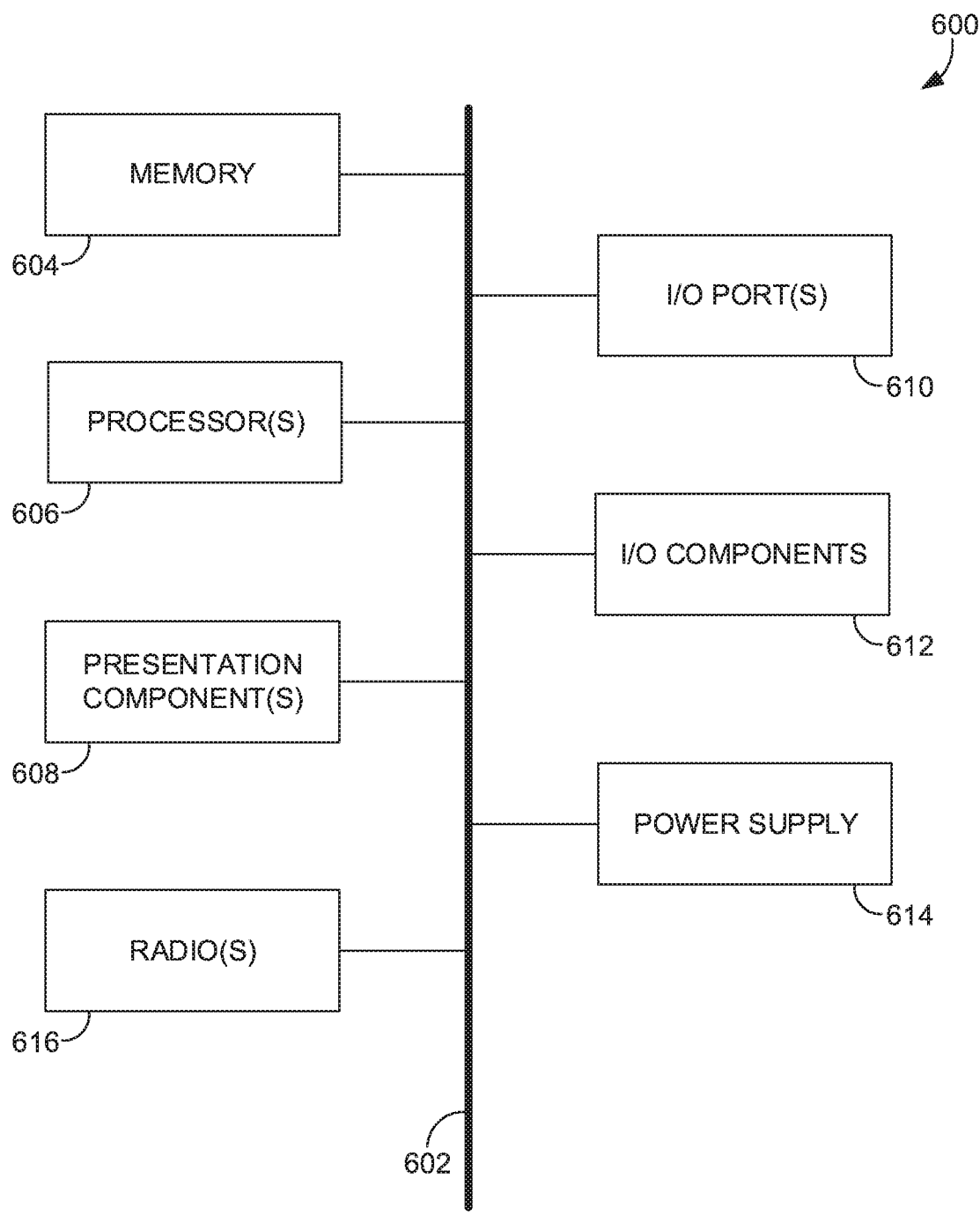
FIG. 6 depicts an exemplary computing device suitable for use in implementations of aspects herein.

Referring now to FIG. 6, a diagram is depicted of an exemplary computing environment suitable for use in implementations of the present disclosure. In particular, the exemplary computer environment is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 602 that directly or indirectly couples the following devices: memory 604, one or more processors 606, one or more presentation components 608, input/output (I/O) ports 610, I/O components 612, and power supply 614. Bus 602 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 612. Also, processors, such as one or more processors 606, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 604 includes computer-storage media in the form of volatile and/or nonvolatile memory. Memory 604 may be removable, nonremovable, or a combination thereof. Exemplary memory includes solid-state memory, hard drives, optical-disc drives, etc. Computing device 600 includes one or more processors 606 that read data from various entities such as bus 602, memory 604, or I/O components 612. One or more presentation components 608 presents data indications to a person or other device. Exemplary one or more presentation components 608 include a display device, speaker, printing component, vibrating component, etc. I/O ports 610 allow computing device 600 to be logically coupled to other devices including I/O components 612, some of which may be built in computing device 600. Illustrative I/O components 612 include a microphone, joystick, game pad, satellite dish, scanner, printer, wireless device, etc.

Radio 616 represents a radio that facilitates communication with a wireless telecommunications network. Illustrative wireless telecommunications technologies include CDMA, GPRS, TDMA, GSM, and the like. Radio 616 might additionally or alternatively facilitate other types of wireless communications including Wi-Fi, WiMAX, LTE, or other VoIP communications. As can be appreciated, in various embodiments, radio 616 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. One or more non-transitory computer-readable media having computer-executable instructions embodied thereon that, when executed, perform a method for managing user devices served by an antenna array, the method comprising: monitoring a sector power ratio of a first wireless communication protocol; based on a determination that the sector power ratio exceeds a first pre-determined threshold, modifying an upper limit of a number of user devices assigned to communicate with the antenna array according to the first wireless communication protocol; and communicating an instruction to re-assign a set of user devices previously assigned to communicate with the antenna array according to the first wireless communication protocol to communicate with the antenna array according to a second wireless communication protocol such that the number of user devices assigned to communicate using the first wireless communication protocol does not exceed the upper limit of the number of user devices assigned to communicate using the first wireless communication protocol.

2. The media of claim 1, wherein the first wireless communication protocol is 5G.

3. The media of claim 1, wherein the second wireless communication protocol is LTE.

4. The media of claim 1, further comprising, upon determining that the sector power ratio exceeds the first pre-determined threshold, monitoring a key performance indicator and determining if the key performance indicator exceeds a second pre-determined threshold.

5. The media of claim 4, wherein the key performance indicator is an average sector throughput, an individual user throughput, or a data usage.

6. The media of claim 5, comprising, determining a magnitude the key performance indicator exceeds the second pre-determined threshold.

7. The media of claim 6, wherein the upper limit of the number of users is based on the determined magnitude.

8. The media of claim 1, wherein the first predetermined threshold is set by a network operator.

9. The media of claim 1, further comprising continually monitoring a current sector power ratio value of the first wireless communication protocol to determine when to instruct to re-assign users from communicating using the second wireless communication protocol to communicating using the first wireless communication protocol.

10. A method for dynamically modifying assignments of user devices between a first wireless communication protocol and a second wireless communication protocol utilized by an antenna array at a cell site, the method comprising: determining that a sector power ratio at the cell site exceeds a threshold; monitoring a key performance indicator to determine a magnitude of disparity between a first threshold and a second threshold; determining an upper limit of a number of user devices to utilize the first wireless communication protocol; and re-assigning a set of user devices from the first wireless communication protocol to the second wireless communication protocol based on the determined upper limit.

11. The method of claim 10, wherein the key performance indicator is an average sector throughput, an individual user throughput, or a data usage.

12. The method of claim 10, wherein the upper limit of the number of users is based on the determined magnitude of disparity.

13. The method of claim 10, wherein the first wireless communication protocol is 5G.

14. The method of claim 10, wherein the second wireless communication protocol is LTE.

15. The method of claim 10, wherein the predetermined threshold is set by a network operator.

16. The method of claim 10, further comprising continually monitoring a current sector power ratio value of the first wireless communication protocol to determine when to instruct to re-assign users from communicating using the second wireless communication protocol to communicating using the first wireless communication protocol.

17. A system for managing user devices served by an antenna array, the method comprising monitoring a sector power ratio of a first wireless communication protocol; based on a determination that the sector power ratio exceeds a pre-determined threshold, modifying an upper limit of a number of user devices assigned to communicate with the antenna array according to the first wireless communication protocol; and communicating an instruction to re-assign a set of user devices previously assigned to communicate with the antenna array according to the first wireless communication protocol to communicate with the antenna array according to a second wireless communication protocol such that the number of user devices assigned to communicate using the first wireless communication protocol does not exceed the upper limit of the number of user devices assigned to communicate using the first wireless communication protocol.

18. The system of claim 17, wherein the first wireless communication protocol is 5G.

19. The system of claim 17, wherein the second wireless communication protocol is LTE.

20. The system of claim 17, wherein the predetermined threshold is set by a network operator.

* * * * *